United States Patent [19]
Sardinskas et al.

[11] Patent Number: 5,143,734
[45] Date of Patent: Sep. 1, 1992

[54] ADJUSTABLE CONVERGING EXTRUDER HOPPER

[75] Inventors: Stuart A. Sardinskas, Bethany; Mathew Mormino, Jr., Seymour; Michael R. Kearney, Milford, all of Conn.

[73] Assignee: Farrel Corporation, Ansonia, Conn.

[21] Appl. No.: 711,321

[22] Filed: Jun. 6, 1991

[51] Int. Cl.$^5$ .................. B29C 47/92; B29C 47/78; B29C 47/66

[52] U.S. Cl. .................. 425/143; 198/550.2; 366/76; 425/145; 425/376.1

[58] Field of Search .............. 425/200, 201, 208, 211, 425/376.1, 377, 378.1, 143, 147, 188, 145, 155; 366/76; 198/550.2

[56] References Cited

U.S. PATENT DOCUMENTS

| | | | |
|---|---|---|---|
| 158,453 | 1/1987 | Andrews | 425/147 |
| 3,068,513 | 12/1962 | Chaffin | 264/176.1 |
| 3,332,369 | 7/1967 | Freed | 425/311 |
| 3,990,820 | 11/1976 | Danguillier et al. | 425/147 |
| 4,212,613 | 7/1980 | Seng | 425/147 |
| 4,247,272 | 1/1981 | Anders | 425/147 |
| 4,465,447 | 8/1984 | Cheigh et al. | 425/378.1 |

FOREIGN PATENT DOCUMENTS

2950636 6/1981 Fed. Rep. of Germany .

Primary Examiner—Willard Hoag
Attorney, Agent, or Firm—Parmelee, Bollinger & Bramblett

[57] ABSTRACT

Flowable molten plastic material is fed downwardly into an adjustable converging hopper mounted on a horizontal extruder barrel. This hopper is positioned around an opening feeding down into the barrel for guiding and deflecting a descending "rope" of plastic material into engagement with screw flights of a rotating feed screw extending along the axis of the extruder barrel. The hopper comprises a box-like structure open at top and bottom and having two opposed side walls which slope inwardly downwardly toward each other for providing a downwardly converging configuration with a pair of vertical parallel end walls interconnecting the side walls. A larger of the two sloping side walls extends downwardly farther than the other and is inclined to vertical at a large angle than the shorter side wall. An adjustable extension of this larger sloping side wall comprises an adjustable converging deflector having a compound-angled surface "X", and this deflector is adjustable downwardly and upwardly along the larger sloping side wall toward and away from the feed screw. Multiple deflection faces on surface X serve to follow approximately a spiral approach to the extruder screw for allowing and enabling molten plastic material to convey against surface X as the extruder screw is rotating into the material. Thus, the molten plastic material can slide over the rotating feed screw and create drag against adjustable surface X. The configuration of this surface provides an undercut for molten plastic material to become drawn into the screw flights and into the extruder.

27 Claims, 5 Drawing Sheets

ADJUSTABLE CONVERGING EXTRUDER HOPPER

FIELD OF THE INVENTION

This invention is in the field of extruders and hoppers for feeding plastic material into extruders. More particularly, this invention relates to an adjustable downwardly converging hopper associated with an extruder barrel for feeding molten plastic material downwardly and inwardly to be drawn into engagement with an extruder feed screw rotating within the barrel and to be drawn into the barrel.

BACKGROUND

It is relatively easy to feed pellets of plastic material into an extruder. The feed entrance down into the extruder barrel can be relatively small, because the pellets drop by gravity and are readily received into the channels between revolving flights of a rotating feed screw to become conveyed and processed downstream within the extruder barrel by the rotating feed screw.

When dealing with flowable molten plastic material being fed into an extruder, the situation is quite different from handling predictable, gravity-fed pellets. Some molten plastic materials exhibit increased stickiness with increasing temperature; others become less sticky with higher temperature. Some molten plastic materials are relatively stiff or have relatively high viscosity; others are relatively flexible or exhibit relatively low viscosity, and others have intermediate characteristics. The result of these variations in characteristics and in consistencies in flowable molten plastic materials has often caused difficulties and problems in attempting to feed such materials into rotating feed screw flights and into the barrel of an extruder. Moreover, new formulations of such materials may evidence unpredictable and inconsistent characteristics of stickiness, viscosity, etc.

SUMMARY

Accordingly, it is among the objects of this invention to address and to overcome or substantially reduce the difficulties and problems of feeding flowable molten plastic materials into extruders.

Among further objects of this invention is to provide a novel, adjustable, converging extruder hopper having an adjustable deflector with compound-angled faces for providing a wide range of adjustments to accommodate feeding different materials having differing viscosities, characteristics and feed rates.

Still another object of this invention is to provide an adjustable converging extruder hopper which is easy to install in a split-level cut-out in a cylindrical extruder barrel.

Still another object of this invention is to provide a novel adjustable converging extruder hopper which is convenient to operate and provides a wide range of adjustments to accommodate the feeding and extrusion of different plastic materials.

Yet another object of this invention is to provide a novel adjustable converging extruder hopper whose convenient adjustments may be made manually by sight or may be automatically controlled to provide consistent and desired extruder outputs, regardless of the differing viscosities, temperatures and feed rates of the materials being fed by the hopper to the extruder.

Among the features and advantages provided by an adjustable converging extruder hopper embodying the invention are those resulting from the fact that users of the apparatus can adjust positions of a movable deflector having a compound-angled multi-faced surface generally following a spiral approach to the extruder screw. This multi-faced surface allows and enables the molten plastic material to be conveyed against it as the extruder screw is rotating into the material. Thus, the molten material can slide over the rotating feed screw and create drag against the adjustable conveying surface, while the compound-angled surface provides an undercut for the plastic material to become drawn into the revolving screw flights and into the barrel. Users have facility of a wide range of adjustments to handle various materials including new formulations. Moreover, the adjustable deflector is conveniently removable to be replaced by another having a different compound-angled surface configuration whenever a change is desired.

In carrying out this invention, in one illustrative embodiment thereof, an adjustable converging extruder hopper is provided for feeding flowable molten plastic to a feed screw mounted in a horizontal extruder barrel. The converging hopper is open at top and bottom with split-level, inwardly and downwardly sloping hopper side walls converging toward each other in the downward direction. One of the sloping side walls is larger in vertical extent than the other and slopes inwardly at a larger angle to vertical than the other forming a lower level leg portion extending downwardly on one side of the bottom open end of the hopper. A vertical chute may be mounted above the top open end of the hopper for providing a protected passageway down through which molten plastic material may flow into the hopper. The split-level bottom of the hopper is adapted to be mounted with a horizontal extruder barrel associated with a feed entrance into the barrel for feeding descending plastic to the feed screw rotating within the barrel. An adjustable deflector is mounted for downward and upward movement along the larger sloping side wall for moving the deflector surface closer to or farther from the rotating extruder feed screw as may be desired by the user. Adjustment drive means are provided for controlling the position of the adjustable deflector, thereby controlling the feeding of molten plastic material to the feed screw and into the barrel of the extruder, whereby an adjustable control of the plastic fed to the extruder is provided to accommodate extruding molten plastic materials of different temperatures, stickiness, viscosities and feed rates.

BRIEF DESCRIPTION OF THE DRAWINGS

The invention, together with further objects, features, advantages and aspects thereof will be more clearly understood from the following description considered in conjunction with the accompanying drawings which are not necessarily drawn to scale with the emphasis instead being placed upon clearly illustrating the principles of the invention. Like reference numerals indicate like elements throughout the different views.

As shown in FIG. 2 the feed entrance into the extruder barrel is eccentrically located with respect to a horizontal plane aligned with the axis of the feed screw, and one sloping side wall of the hopper is longer than the other, thus giving an overall split-level appearance to the assembly of hopper and extruder barrel as seen in FIG. 2.

DETAILED DESCRIPTION OF THE PREFERRED EMBODIMENTS

Figure 1:
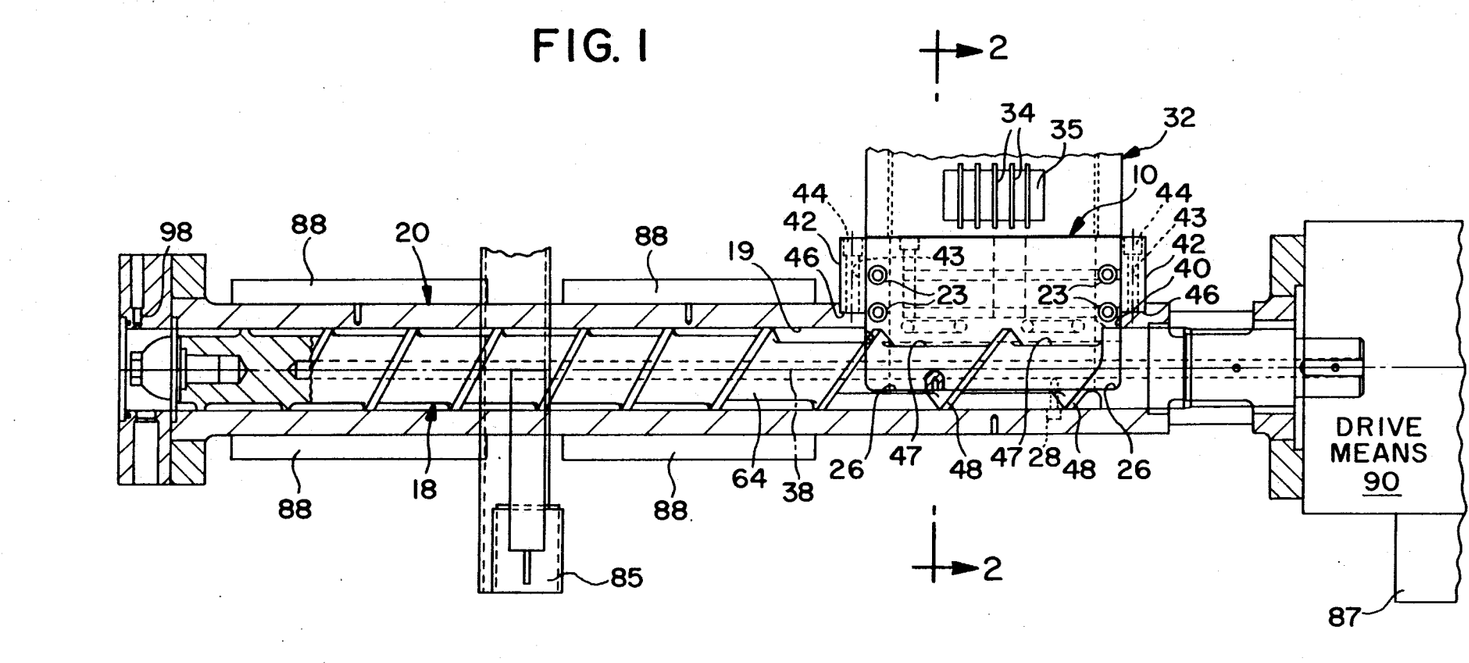
FIG. 1 is a longitudinal, sectional, elevational view of a horizontal circular cylindrical extruder barrel housing a feed screw. The extruder barrel has a feed entrance and an adjustable hopper is associated with the feed entrance for feeding flowable molten plastic material to the flights of the feed screw and into the extruder barrel.
Figure 2:
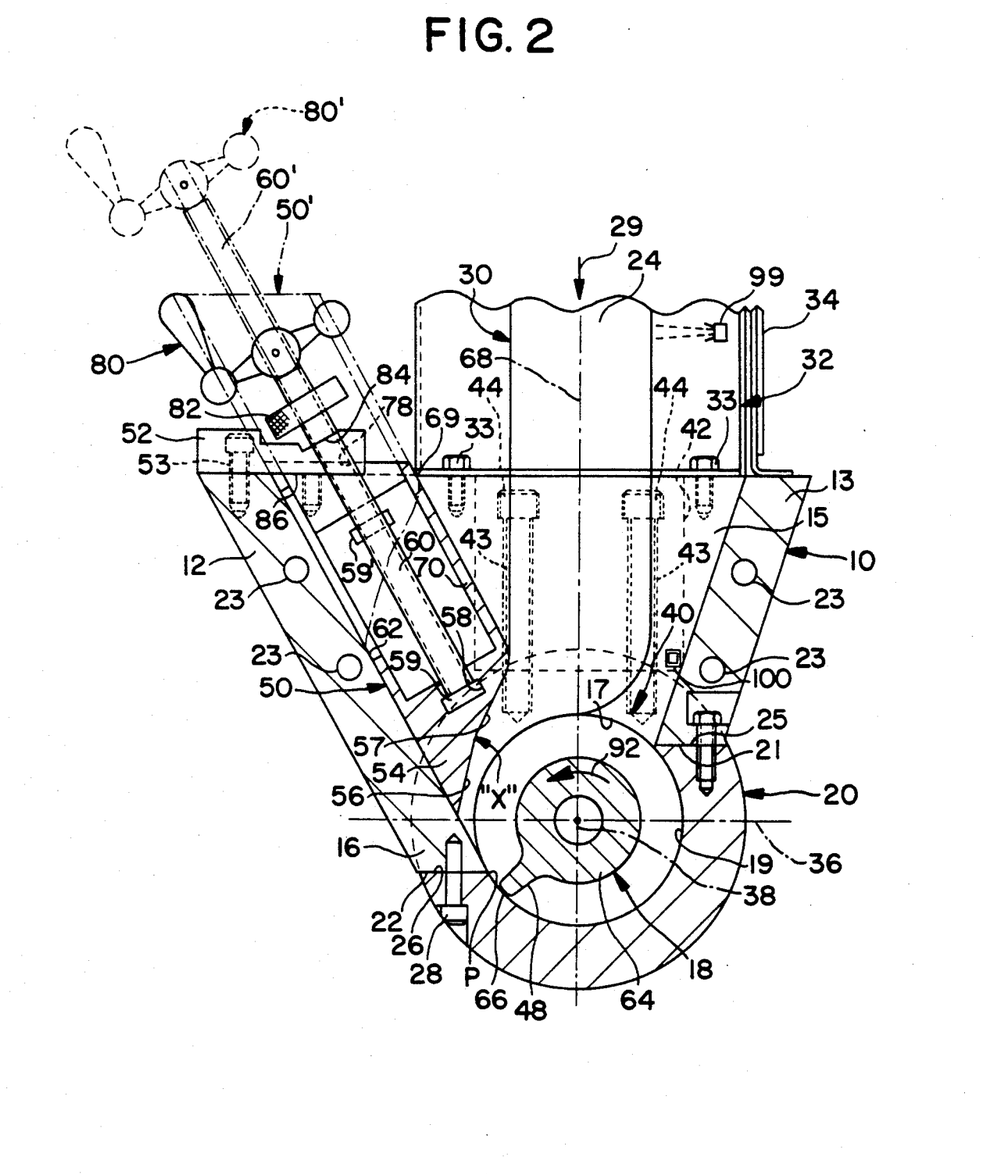
FIG. 2 is an enlarged cross-sectional, elevational view taken along the plane 2—2 in FIG. 1 looking to the right for showing the adjustable converging hopper in cooperative association with a rotating feed screw and aiding in flow of molten plastic material into the feed screw and into the extruder barrel in accordance with the present invention.
Figure 3A:
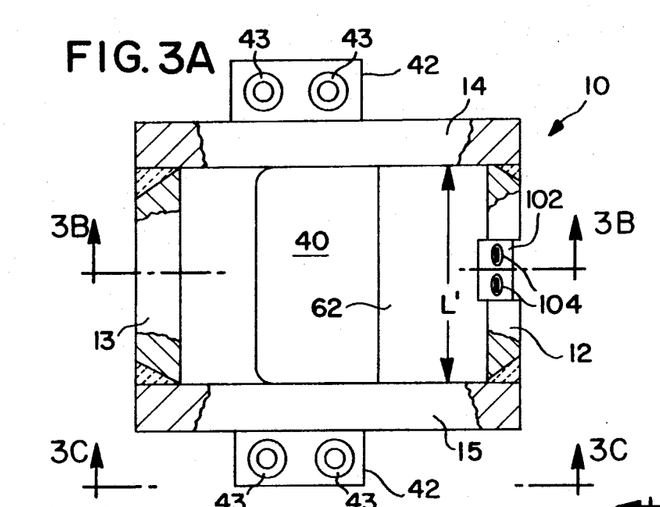
FIG. 3A is a top plan view, partially in section, of only the hopper of FIG. 2, with the longer sloping side wall of the hopper being shown on the right in FIG. 3A.
Figure 3B:
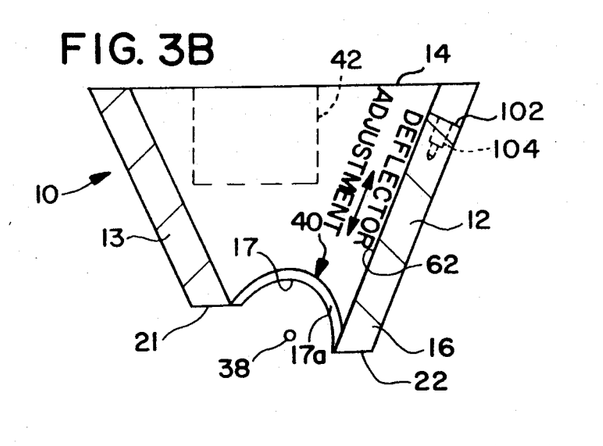
FIG. 3B is a cross-sectional view taken along the plane 3B—3B in FIG. 3A.
Figure 3C:
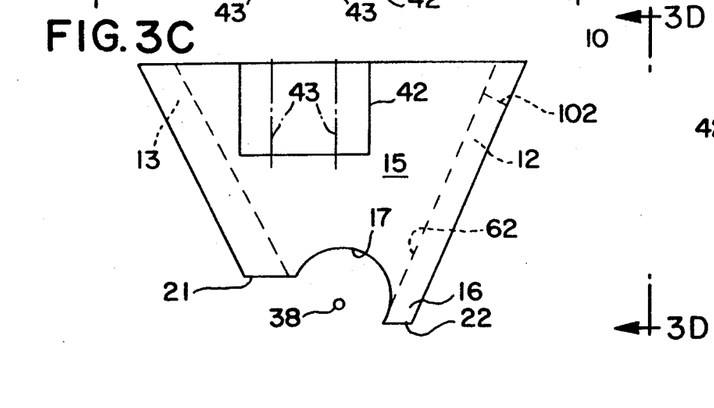
FIG. 3C is an end elevational view of the hopper shown in FIG. 3A as seen looking from the direction 3C—3C in FIG. 3A.
Figure 3D:
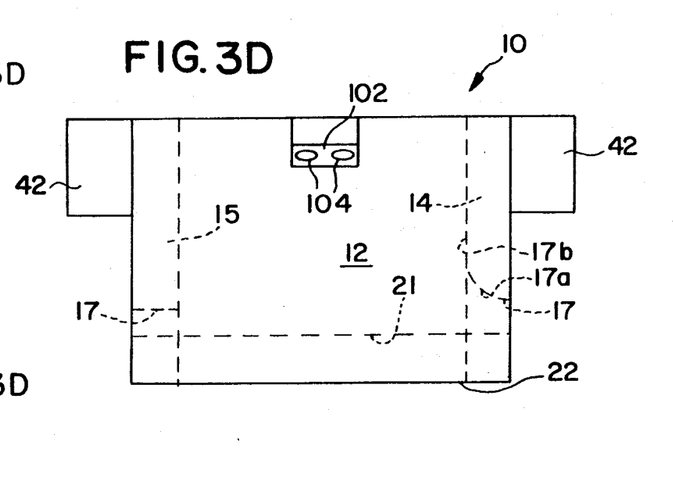
FIG. 3D is a side elevational view of the hopper as seen looking in the direction 3D—3D in FIG. 3C.

Referring now to FIGS. 1 and 2, an adjustable converging extruder hopper, referred to generally by the reference numeral 10, has downwardly converging side walls 12 and 13 interconnected by end walls 14 and 15 as will best be seen in FIGS. 3A through 3D. The end walls 14 and 15 and side walls 12 and 13 are shown welded together to form a strong, rugged, generally rectangular box-like structure as seen in FIG. 3A. This box-like hopper 10 is open at the top and bottom, with its two end walls 14 and 15 being parallel and its two sloping side walls 12 and 13 converging downwardly toward each other. The sloping wide wall 12 is considerably longer than the opposite sloping wall 13, thereby providing a downwardly projecting lower leg portion 16 (FIGS. 3B and 3C). Each of the end walls 14 and 15 is cut away along an arc 17 (FIGS. 3B and 3C) of circular curvature for providing clearance for a rotatable feed screw 18 (FIGS. 1 and 2) extending along the axis of a circular cylindrical extruder barrel 20. In this embodiment of the invention, these arcuate clearances 17 are aligned with the inner surface 19 of the extruder barrel 20, as shown in FIG. 2.*

* Surface 17 and Surface 17b are orthogonal surfaces subtended by arc 17a which produces a generally conical shape between surface 17 and 17b.

at its lower edge in an upper level horizontal flat 21, while longer side wall 12 is terminated at its lower edge in a lower level horizontal flat 22 leaving a lower level leg 16 of the wall 12 as compared with wall 13. The sloping side walls 12 and 13 of the hopper 10 are shown in FIG. 2 provided with cooling cores 23 in which cooling fluids can be circulated for controlling temperatures of flowable molten plastic material 24 which is to be fed into the extruder barrel 20. The split-level flats 21 and 22 of the side walls 13 and 12, respectively, of the hopper 10 are mounted onto mating horizontal flats 25 and 26, respectively, on the extruder barrel 20 by mounting screws 28.

The flowable plastic material 24 is moving downwardly in a rope-like form 30 as indicated by a flow arrow 29. This "rope" 30 of molten plastic is coming down from a suitable source, for example such as a twin-rotor continuous mixer (not shown). In order to protect and enclose this hot, descending plastic rope 30, there is a hopper chute 32 attached by mounting screws 33 (FIG. 2) on the hopper end walls 14 and 15. The chute 32 has a protective grate 34 thereon covering a window 35 for providing visual and instrument access to the interior of the chute. Flowable plastic material 24 may comprise materials such as polymers, resins, elastomers and the like. The window 35 in the chute 32 provides not only a visual view but allows temperature readings to be made if desired using a radiometric device such as a radiometer, pyrometer or the like.

In its overall appearance as seen in FIGS. 2, 3B and 3C, the converging hopper 10 has a split-level configuration at the bottom. Shorter side wall 13 is terminated In FIG. 2 a horizontal plane 36 is indicated by a dashed line; this horizontal plane passes through and is aligned with a longitudinal central axis 38 of the feed screw 18 shown concentric with the circular cylindrical extruder barrel 20. The mounting flats 25 and 26 on the extruder barrel 20 are located generally on diametrically opposite sides of the barrel axis 38. The mounting flat 25 is located at a higher level spaced above the horizontal plane 36 by a distance slightly greater than the radial thickness of the extruder barrel 20, while the flat 26 is located at a lower level spaced below the horizontal plane 36 by a distance slightly less than the radial thickness of the extruder barrel 20, as will be appreciated by looking closely at FIG. 2. Consequently, these substantially diametrically opposed mounting flats 25 and 26 define between themselves a large opening in the barrel 20 serving as a wide entrance 40 (FIG. 2) into the feed screw and extruder barrel.

In order to mount the hopper 10 around this feed entrance 40, there are shown a pair of relatively large blocks 42 (FIGS. 1, 3A, 3C and 3D) welded onto the parallel end walls 14 and 15 for serving as mounting flanges. Each of these mounting blocks 42 is shown vertically drilled and countersunk at 43 (FIGS. 1 and 3A) for receiving a pair of large machine screws 44 threaded into a pair of sockets in the wall of the extruder barrel 20 near each end of the feed entrance 40. For receiving these mounting blocks 40, horizontal flats 46 are shown in FIG. 1 machined on the exterior of the barrel 20 adjacent to each end of the feed entrance 40.

For facilitating and aiding in feeding of either relatively stiff high viscosity plastic material 24 or relatively flexible low viscosity plastic material, including any plastic materials of intermediate viscosities, into channels 47 (FIG. 1) between flights 48 of the feed screw 18 and into the extruder barrel, there is an adjustable converging deflector 50, as seen in FIG. 2. In effect, this deflector 50 serves as an adjustable extension of the larger sloping wall 12. This deflector is adjustably mounted by a bracket 52 and bracket screws 53 on the hopper side wall 12 for adjustable movement upwardly and downwardly along the side wall 12 and along the lower extending leg portion 16 of this side wall 12. Such adjustment is produced by an adjusting screw 60 to be described later. The adjustable deflector 50 is terminated in a bottom wall 54 forming surface "x" which has compound-angled, deflector-shaped inclined faces 56, 57, as is seen both in FIG. 2 and in FIG. 4C.

Figure 4A:
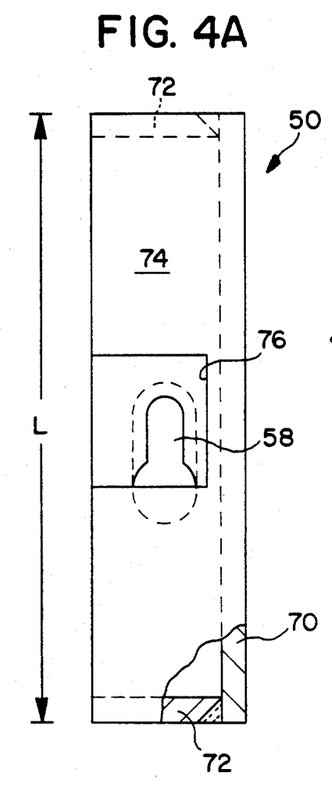
FIG. 4A is a top plan view, partially in section, showing an adjustable converging deflector which is movable upwardly and downwardly along the longer sloping side wall of the adjustable converging extruder hopper shown in FIG. 2. In operation this adjustable deflector serves as an adjustable extension of the hopper wall.
Figure 4B:
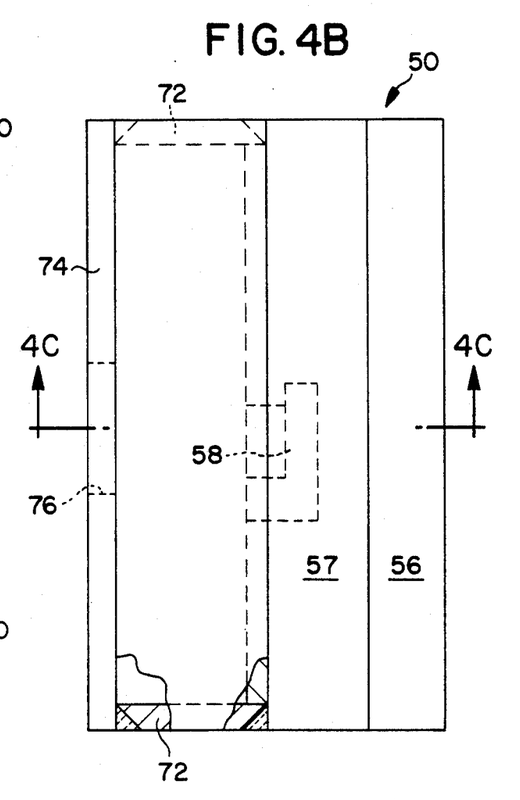
FIG. 4B is a side elevational view, partly in section, of the adjustable converging deflector.
Figure 4C:
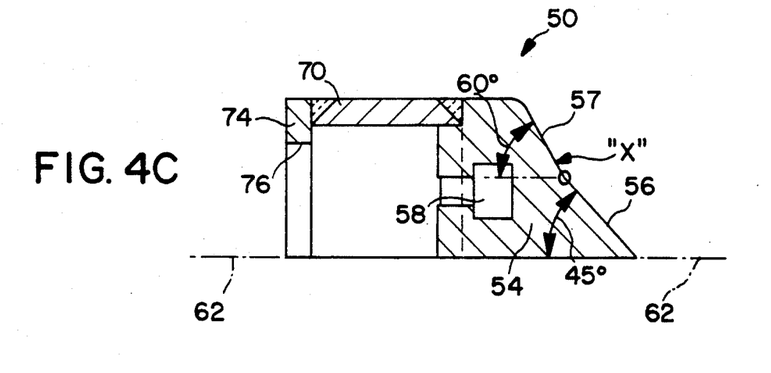
FIG. 4C is a cross-sectional view of the adjustable converging deflector taken along the plane 4C—4C in FIG. 4B.

As shown in FIGS. 4A through 4C the adjustable deflector 50 is hollow with a keyhole socket slot 58 in the bottom wall 54 for receiving, engaging and capturing a head 59 (FIG. 2) on the adjusting screw 60. The compound angle of the deflector surface "x" comprises a lower face 56 shown at an angle of 45° to a wall line 62 (FIG. 4C) and an upper face 57 at a larger angle of 60° to the wall line 62. Said face 56 is inclined at an acute angle in the range of about 25° to about 50° to said sloping wall; and said face 57 is inclined to said sloping wall at an acute angle larger than said first acute angle and being inclined to said sloping wall at an acute angle lying in the range of about 40° to about 70°. By comparing FIG. 4C with FIG. 2, it will be seen that the wall line 62 is defined by the inner surface of the sloping hopper side wall 12, and the adjustable deflector 50 is slidable upwardly and downwardly along this wall line 62. Moreover, it is seen by a close examination of FIG. 2, that the downward direction of this wall line 62 is tangent to the inner surface 19 of the extruder barrel 20 at point "P", and thus this wall line 62 is also substantially tangent with a circular path of travel of the revolving tip 66 of a generally helical screw flight 48 of the rotating feed screw 18. The extruder feed screw 18 is shown with a shank or root 64 shown with an axial bore, and the generally helical screw flight 48 has its tip 66 revolving around axis 38 closely spaced from the inner surface 19 of the extruder barrel 20.

The particular compound angles of the faces 56 and 57 of surface X are adaptable for suiting characteristics of the flowing rope 30 of the plastic material and for suiting extruder applications as well as for suiting the specifications of the feed screw 18 operating in the extruder barrel 20. In order to obtain a different compound-angled surface X, the bracket screws 53 and bracket 52 are removed so that the adjusting screw 60 can be conveniently withdrawn from the hopper 10, for withdrawing the deflector 50 to be replaced by another deflector having a different compound-angled surface X, as may be desired by the user.

It is to be noted in FIG. 2 that the two deflector faces 56 and 57 serve to follow generally a spiral approach to the extruder screw: namely, lowermost exposed surface of the wall line 62 along its lower leg portion 16 is about tangent to the revolving path of the tip 66 of the screw flight 48; then the face 56 is at an angle of about 45° to such a tangent; and then the face 57 is at an angle of about 60° to such tangent. The lower face 56 is a primary conveying surface, and the upper face 57 is a secondary conveying surface. It is preferred to have at least one secondary conveying surface. If desired for a particular application, there may be a second secondary surface located above and contiguous with surface 57; such second secondary surface is oriented at an angle to the wall line tangent 62 larger than the angle of the first secondary surface 57 so as to follow a generally spiral approach to the extruder screw 18.

The adjustable deflector 50 is shown as being an integrally welded assembly as seen in FIGS. 4A through 4C. It includes a main inner wall 70 welded to the bottom wall 54, so as to be parallel with the hopper side wall 12 and a pair of parallel end walls 72 welded to the main inner wall 72 and to the bottom wall 54. The outside length dimension L of the deflector 50 between its parallel end walls 72 is slightly less than the spacing L' (FIG. 3A) between the parallel end walls 14 and 15 of the hopper 10, so that the deflector advantageously is guided along its adjustment path by these hopper end walls 14 and 15 in cooperation with the wall line 62 of the hopper side wall 12. Also, there may be a top wall 74 welded onto the tops of the main inner wall 70 and the end walls 72. This top wall 74 is shown provided with an access port 76 so that the adjusting screw 60 can extend down through this port 76 for inserting its head 59 into the keyhole socket 58. If desired, the deflector 50 can be provided with cooling passages and heating cartridges for controlling its temperature, for minimizing any sticking tendency of the molten plastic materials 24, depending upon whether their stickiness characteristics are reduced by cooling or heating and for controlling viscosities of such materials.

This adjusting screw 60 is threaded through a screw hole 78 in the bracket 52 and is shown in FIG. 2 as being operated by a hand crank 80. A multi-lobed lock nut or thumb wheel 82 is mounted on the adjustment screw 60 and can be seated against a diagonal seat 84 in the mounting bracket 52 for locking the adjusting screw 60 in any desired adjusted position. When an adjustment is desired to be made, the locking thumb wheel 82 is loosened, and the hand crank 80 is operated for moving the adjustable deflector 50 along the side wall 12 of the hopper 10, and then the wheel 82 is again locked for holding the new adjusted position.

In FIG. 2, the adjustable deflector 50 is shown in cross section in a lowered position with respect to the extruder screw 18. Also, there is an elevated dashed and dotted outline 50' of the deflector for indicating its most elevated position, and the hand crank 80' is illustrated in its most elevated position, thereby showing that a wide range of adjustments may be provided for the adjustable deflector 50. A stop 86 is shown for limiting upward travel of the adjustable deflector 50. The adjustable deflector is movable over a range of adjustment at least equal to a diameter of the root 64 of the extruder feed screw.

The hopper chute 32 is symmetrically positioned vertically above the axis 38 of the feed screw 18 and extruder barrel 20, such that the vertical centerline 68 of the chute is directly aligned with the axis 38. The shorter sloping side wall 13 is shown inclined inwardly downwardly at an angle of about 18° to 20° relative to the vertical centerline 68, while the longer sloping side wall 12 is shown inclined inwardly downwardly at a larger angle of about 30°. By virtue of this split-level eccentric orientation of the hopper 10, there is sufficient clearance for operation of the deflector 50 in the region between the sloping wall line 62 and the lower end of the chute 32 at 69 (FIG. 2). Thus, the deflector 50 has sufficient clearance to be adjustable upwardly and downwardly over a wide range of travel along the wall line 62 of wall 12, and also enough clearance to be completely withdrawn and replaced by another deflector having a multi-faced surface X of different configuration, as discussed above.

In FIG. 1 the extruder barrel 20 is shown mounted on a support 85 with another support being shown at 87, and the barrel is shown surrounded by heating and cooling means 88. Drive means 90 for rotating the feed screw 18 are shown in outline in FIG. 1 mounted on support means 87.

In operation, the converging hopper 10 is optimized in performance by adjusting upwardly or downwardly the deflector 50 which functions to be adaptable for effectively guiding and deflecting different types of plastic, whether relatively rigid or relatively flexible, or of intermediate viscosities, into the extruder barrel 20. As flowable plastic material 24 descends into the hopper 10, this molten material is directed against the compound-angle surface X of the adjustable deflector 50 as the flights 48 of the extruder screw 18 turn into the plastic material as shown by a screw rotation arrow 92. The converging deflector 50 enables and allows molten plastic material 24 to be conveyed against surface X as the screw is turning into the plastic material. The plastic material 24 can slide over the feed screw 18 creating a drag against surface X. The compound angle configuration of this surface X provides an approaching spiral-like undercut for the molten plastic material 24, thereby drawing this material into the channels 47 between the screw flights 48 and into the extruder barrel. The adjustable deflector 50 with its compound angular deflector surface has a very large range of adjustment as shown to accommodate a wide range of characteristics of various plastic materials, thereby accommodating plastics of varying viscosities, compositions, temperatures and feed rates.

Figure 5:
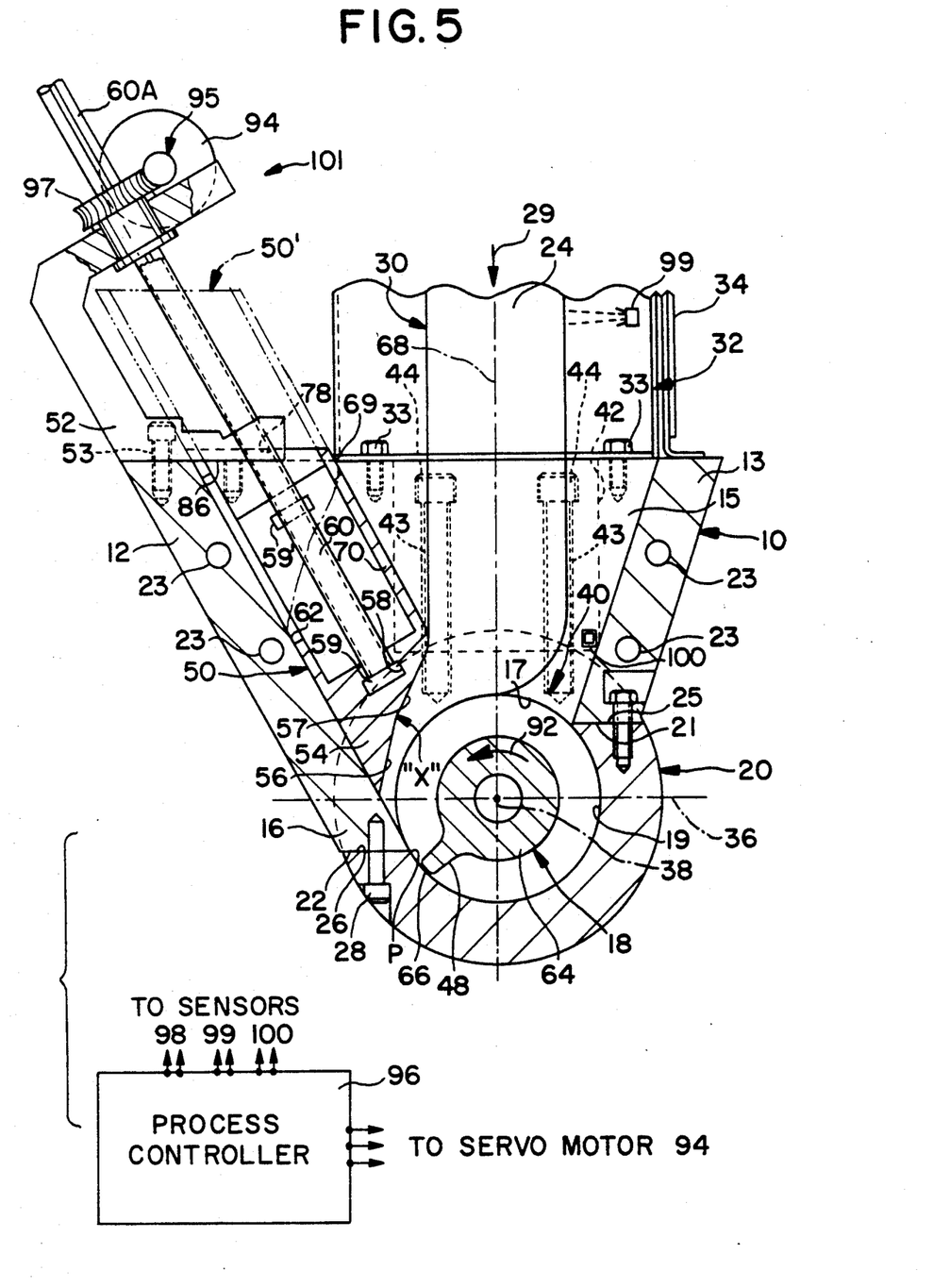
FIG. 5 is a view similar to FIG. 2 showing an automated drive system for automatically moving the deflector toward or away from the feed screw in response to feedback transducer means sensing one or more parameters of the flowable plastic material.

The adjustment may be manually by a crank 80 as shown in FIG. 2, or adjustment can be automatically driven as shown in FIG. 5 by a programmable electric servo motor 94, for example such as a stepper motor, which is electrically linked to and controlled by a computer process controller 96. Feedback transducers 98 (FIG. 1) and 99 (FIG. 5) sense pressure and temperature, respectively, and a level indicator sensor 100 (FIG. 5), for example a photocell, senses the configuration or level of the plastic mass flow 29, 30. These sensors 98, 99 and 100 are electrically connected to the controller 96, as indicated in FIG. 5, for feeding their respective signal data to the process controller 96 in order to provide and control an automated drive system 101 for automatically positioning the compound angle deflector 50 toward and away from the rotating extruder feed screw 18 for optimizing performance of the extruder 20. The servo motor 94 is shown operating a worm gear drive 95 mounted on an extension of bracket 52. This worm gear drive 95 includes a driven gear 97 with its hub rotatably mounted on bracket 52. An upward extension 60A of the adjusting screw or rod 60 is splined or keyed to the bore of the hub of gear 97. Thus, the adjusting screw 60 can be turned by rotation of the driven worm gear 97. The splined rod 60A can slide through the hub of this driven gear 97. This automated drive system 101 effectively holds the deflector 50 locked in any controlled adjusted position by holding the threaded rod 60 stationary in its screw hole 78, and it quickly shifts this deflector to new adjusted positions in response to changing data from sensors 98, 99 and 100 by turning the threaded rod 60 upwardly or downwardly through its screw hole 78.

Further modifications which may be made in the apparatus embodying the invention will now be discussed. In FIG. 2, the bracket 52 is shown mounted horizontally on the top of the hopper 10; it has a diagonal seat 84 for the locking thumb wheel 82; and there is a diagonal screw hole 78 for receiving the adjusting screw 60. FIGS. 3A through 3D show a notch 102 with its bottom surface perpendicular to the wall line 62 of the longer sloping side wall 12. It will be understood that a modified bracket mounted in this notch 102 with screws engaged in screw holes 104 will be oriented perpendicular to the axis of the adjusting screw 60 (FIG. 2) such that the diagonal seat 84 can be omitted and the axis of the screw hole 78 can be oriented conveniently perpendicular to the length of such modified bracket. In FIGS. 4A through 4C the main inner wall 70 of deflector 50 is shown relatively short in the direction parallel with wall line 62; whereas in FIG. 2 the wall 70 is shown relatively longer in the direction parallel with the wall line 62. Also, FIG. 2 shows an embodiment of the deflector 50 without a top wall 74.

Throughout the description, the adjustable assembly 50 has been called a "deflector". This assembly 50 is also serving the functions of acting as a diverter for diverting molten plastic materials and also is acting as an adapter for adapting the converging hopper flow path to accommodate molten plastic materials having different characteristics, consistencies, viscosities, stickiness, feed rates, etc. Accordingly, the term "deflector" is intended to be interpreted sufficiently broadly to include the concepts and functions of "diverter" and "adapter".

Since other changes and modifications varied to fit particular operating requirements and environments will be recognized by those skilled in the art, the invention is not considered limited to the examples chosen for purposes of illustration and includes all changes and modifications which do not constitute a departure from the true spirit and scope of this invention as claimed in the following claims and equivalents thereto.

We claim:

1. An adjustable converging extruder hopper for feeding molten plastic to an extruder feed screw rotatable about its axis and into an extruder barrel in which the feed screw is rotating, the rotating feed screw having at least one screw flight with a tip movable in a circular path about said axis, said hopper comprising:
   two side walls;
   two end walls interconnecting said side walls;
   at least one of said side walls sloping downwardly inwardly toward the other side wall;
   said hopper having means for assembly with an extruder barrel with said one sloping side wall defining a wall line extending in a direction substantially tangent to said circular path;
   deflector means movable along said wall line toward and away from an extruder feed screw in an extruder barrel with which the hopper is assembled;
   said movable deflector means having a deflector surface including at least one face inclined at an acute angle to said wall line; and
   adjusting means for adjusting positioning of said movably deflector means along said wall line toward and away from the extruder feed screw.

2. An adjustable converging extruder hopper as claimed in claim 1, in which:
   said deflector surface includes at least two faces;

a first of said faces being located closer to said wall line and a second of said faces being located farther from said wall line;

said second face being contiguous with said first face;

said first face being inclined at a first acute angle to said wall line;

said second face being inclined at a second acute angle to said wall line; and said second acute angle being larger than said first acute angle.

3. An adjustable converging extruder hopper as claimed in claim 2, in which:

said first acute angle being about 45°; and said second acute angle being about 60°.

4. An adjustable converging extruder hopper as claimed in claim 2, in which:

said first and second faces of said deflector surface generally follow a spiral approach to the extruder feed screw.

5. An adjustable converging extruder hopper as claimed in claim 1, in which:

said movable deflector means has a deflector surface including a plurality of contiguous faces; and said plurality of faces generally define a spiral approach to the extruder feed screw.

6. An adjustable converging extruder hopper as claimed in claim 1, in which:

said adjusting means comprise an adjusting screw coupled to said movable deflector means, and drive means are associated with said adjusting screw for rotating said adjusting screw.

7. An adjustable converging extruder hopper as claimed in claim 1, in which:

said two end walls are parallel and have a predetermined spacing L' between then;

said two end walls are perpendicular to said wall line defined by said one sloping side wall;

said movable deflector means has a pair of spaced end surfaces; and spaced end surfaces define a length L slightly less than said predetermined spacing L' for guiding said movable deflector means between said end walls as said movable deflector means is adjusted in position along said wall line toward and away from the extruder feed screw.

8. An adjustable converging extruder hopper as claimed in claim 1, in which:

the other side wall slopes downwardly inwardly toward said one side wall;

said one side wall slopes at a larger angle to vertical than said other side wall and is longer than said other side wall; and said one side wall is substantially tangent to said circular path at a tangent point located below a horizontal plane aligned with said axis and passing through said axis.

9. An adjustable converging extruder hopper as claimed in claim 6, in which:

said drive means include manual drive mechanism.

10. An adjustable converging hopper as claimed in claim 6, in which:

said drive means are automatic.

11. An adjustable converging hopper as claimed in claim 1, in which:

said movable deflector means include temperature control means for controlling the temperature of said movable deflector means.

12. Adjustable converging hopper means for directing molten plastic to an extruder feed screw for feeding into an extruder barrel within which the extruder screw is rotatable about an axis, said extruder barrel having an interior surface, said hopper means comprising:

means for assembling said hopper means with an extruder barrel for positioning an inner surface of a side wall of said hopper means to provide a wall line extending in a direction tangent to said interior surface of the extruder barrel;

movable deflector means adjacent to said wall line;

said movable deflector means being movable along said wall line toward and away from said extruder feed screw;

said movable deflector means having a deflector surface facing generally toward an extruder feed screw within the extruder barrel;

said deflector surface being oriented generally in acute angle relationship with said wall line;

a first portion of said deflector surface close to said wall line being closer to said extruder feed screw than a second portion of said deflector surface which is farther from said wall line; and adjustable positioning means for adjusting a position of said movable deflector along said wall line for adjusting said deflector surface toward and away from the extruder feed screw.

13. Adjustable converging hopper means as claimed in claim 12, in which:

said first portion of said deflector surface being a first face;

said second portion of said deflector surface being a second face;

said first face being oriented at a first acute angle relative to said wall line;

said second face being oriented at a second acute angle relative to said wall line; and said second acute angle being larger than said first acute angle.

14. Adjustable converging hopper means as claimed in claim 13, in which:

said first acute angle being in a range from about 25° to about 50°; and second acute angle being larger than said first acute angle and is in a range from about 40° to about 70°.

15. Adjustable converging hopper means as claimed in claim 13, in which:

said first and second faces in association with said wall line provide generally a spiral approach to the rotatable feed screw.

16. Adjustable extruder hopper means for feeding flowable plastic materials to a rotatable extruder feed screw rotatable around an axis within an extruder barrel comprising:

a downwardly converging hopper having upper and lower open ends;

said lower end of said hopper having means for mounting on an extruder barrel;

said hopper including a side wall sloping downwardly and inwardly toward a vertical plane aligned with and passing through the axis of a feed screw within the extruder barrel;

adjustable wall means mounted on said side wall for adjusting movement relative to said side wall;

said adjustable wall means being terminated in a guiding deflector surface for directing flowable plastic materials fed into said upper end of said hopper to the rotatable feed screw within the extruder barrel; and drive means controlling movement of said adjustable wall, thereby controlling the feeding of flowable plastic materials to the rotatable feed screw of the extruder, whereby an adjustable control of flowable plastic materials fed to the extruder is provided to accommodate extruding of flowable plastic materials of different temperatures, viscosities, stickiness and feed rates.

17. Adjustable extruder hopper means as claimed in claim 16 wherein said guiding deflector surface has a plurality of differently inclined faces.

18. Adjustable extruder hopper means as claimed in claim 16 wherein said drive means comprise:

manual drive mechanism having a threaded adjustment rod extending into and being connected with said adjustable wall means;

said threaded adjustment rod being movable with said adjustable wall means;

a support mounted on said side wall;

said threaded adjustment rod being engaged in a screw hole in said support; and a hand crank positioned above said support and being coupled to said threaded adjustment rod for moving said adjustable wall.

19. Adjustable extruder hopper means as claimed in claim 18, in which:

a locking wheel is screwed onto said threaded adjustment rod above said support; and said locking wheel is manually engageable with said support for locking said threaded adjustment rod relative to said support for holding adjusted positioning of said adjustable wall means.

20. Adjustable extruder hopper means as claimed in claim 17, wherein:

said plurality of faces comprise a first face inclined at an acute angle in the range of about 25° to about 50° to said sloping wall; and a second face inclined to said sloping wall at an acute angle larger than said first acute angle and being inclined to said sloping wall at an acute angle in the range of about 40° to about 70°.

21. An adjustable converging extruder hopper for feeding plastic into an extruder comprising:

first and second downwardly converging side walls and parallel end walls interconnecting said side walls for forming a downwardly converging hopper having a top opening;

said hopper having a split level bottom opening formed by said first side wall extending downwardly farther than said second side wall;

an adjustable wall mounted for adjustable movement on said first hopper side wall;

said adjustable wall having a plurality of differently angled deflector surfaces; and means for driving the adjustable movement of said adjustable wall, thereby controlling the position of said deflector surfaces of said adjustable wall for controlling the feed of plastic into an extruder on which the hopper is positioned.

22. An adjustable converging extruder hopper as claimed in claim 21, in which:

said drive means comprise hand operable linkage means coupled to said adjustable wall for controlling movement thereof.

23. An adjustable converging extruder hopper as claimed in claim 21 wherein:

said plurality of differently angled deflector surfaces comprise a first face inclined at an angle in the range of about 25° to about 50° relative to a direction of movement of said adjustable wall and a second face inclined at a larger angle to said direction; and said larger angle is in a range of about 40° to about 70°.

24. An adjustable converging extruder hopper as claimed in claim 2, in which:

said movable deflector means are movable along said wall line toward and away from an extruder feed screw in an extruder barrel with which said hopper is assembled over a range of adjustment of said deflector means at least equal to a diameter of a root of the extruder feed screw in a portion of the feed screw toward which and away from which said deflector means are adjusted.

25. Adjustable converging hopper means as claimed in claim 12, in which:

said deflector surface of said movable deflector means is movable over a range of adjustment at least equal to a diameter of a root of the extruder feed screw in a region of the feed screw toward which said deflector surface is movable.

26. Adjustable extruder hopper means as claimed in claim 16, in which:

said adjustable wall means are adjustable over a range of travel at least equal to a diameter of a root of an extruder feed screw in a region of the rotatable feed screw toward which the flowable plastic materials are movable.

27. An adjustable converging extruder hopper as claimed in claim 21, in which:

said adjustable wall is mounted for movement over a range of travel at least equal to a diameter of a root of an extruder feed screw in a region of an extruder feed screw with which said hopper is being used.

* * * * *